United States Patent [19]

Kinoshita

[11] Patent Number: 4,893,536

[45] Date of Patent: Jan. 16, 1990

[54] CENTER PUNCHING APPARATUS

[75] Inventor: Kaoru Kinoshita, Kawagoe, Japan

[73] Assignee: Nikka Engineering Co., Ltd., Asaka, Japan

[21] Appl. No.: 240,811

[22] Filed: Sep. 6, 1988

[30] Foreign Application Priority Data

Oct. 7, 1987 [JP] Japan .................................. 62-251693

[51] Int. Cl.$^4$ ............................................. B26F 1/14
[52] U.S. Cl. ......................................... 83/451; 83/521; 83/685; 83/700; 83/522.23
[58] Field of Search ................. 83/522, 451, 520, 685, 83/521, 637, 640, 641, 613, 700

[56] References Cited

U.S. PATENT DOCUMENTS

| | | | |
|---|---|---|---|
| 1,630,659 | 5/1927 | Hacker | 83/520 X |
| 3,079,140 | 2/1963 | Sorchy | 83/451 |
| 3,332,308 | 1/1967 | Keen | 83/685 X |
| 3,719,115 | 3/1973 | Muri | 83/414 |
| 3,763,730 | 10/1973 | Ahlegian | 83/521 |
| 3,807,265 | 4/1974 | Mohr | 83/278 |
| 3,982,458 | 9/1976 | Terasaka | 83/685 |
| 4,674,373 | 6/1987 | Kuppinger | 83/49 |

Primary Examiner—Douglas D. Watts
Assistant Examiner—Eugenia A. Jones
Attorney, Agent, or Firm—Emmanuel J. Lobato; Robert E. Burns

[57] ABSTRACT

A center punching apparatus is disclosed as having an upper die base and a lower die base relatively movable. An upper die is mounted on the upper die base facing downwardly and on the lower die base a rotatable turntable is mounted for rotation about an axis coaxial with the upper die. A movable table on the turntable holds the workpiece of a material to be punched and is movable accurately in X and Y directions by micrometers for independent movement. The workpiece can thus be moved in X and Y directions on the apparatus without relating the movements to any X and Y coordinate system on the workpiece. The workpiece is accurately marked with reference indicia such as a circle, a line or a plurality of points for accurately monitoring the position of the indicia by direct visual viewing of the indicia through a microscope. The workpiece is accurately positioned by rotating the turntable and moving of the movable table along X and Y directions with the material to be punched thereon.

7 Claims, 3 Drawing Sheets

CENTER PUNCHING APPARATUS

BACKGROUND OF THE INVENTION

This invention relates generally to machine tools and more particularly to a center punching apparatus for punching a central portion of a work piece or blank of a material marked by reference indicia.

PRIOR ART

In conventional center punching apparatus the position of a workpiece's center, on x and y coordinates on the material, is first determined. These x and y coordinates must then be converted into the X and Y coordinate values on the punching apparatus to determine the exact position at which the material is to be punched. The center of the workpiece is then moved to the position of the die which is on the X and Y coordinates that have been measured in advance.

Conventional center punching apparatus or presses have several factors that lead to errors in a punching operation. Errors occur when measuring the position of the material center in the x and y coordinates. Other errors occur when setting and securing the material in position in the punching apparatus. These latter errors arise from the deviation between the x and y coordinate system on the material and the X and Y coordinate system of the apparatus. Errors occur also when the position of the die is measured on the X and Y coordinates. Because of these errors it is difficult for conventional punching apparatus to perform precision punching operations that require a very high accuracy, in the order of several microns to some dozen microns.

SUMMARY OF THE INVENTION

It is an object of the invention to provide a center punching apparatus that can eliminate the errors of known apparatus and punch the center of a workpiece with a very high accuracy.

The center punching apparatus according to the invention has an upper die base. An upper die is mounted facing downwardly on the upper die base. A lower die base is provided below the upper die base and has a rotatable turntable mounted thereon for rotation about an axis coaxial with the upper die. On the turntable is provided a movable table for holding a workpiece of a material to be punched. The turntable is movable in X and Y directions. A lower die is disposed centrally on the turntable coaxial with the upper die.

A pair of micrometers is provided for moving the movable table in X and Y directions independently so that it is accurately positioned and accordingly accurately positions the workpiece relative to the upper die. The lower die base, the turntable, the movable and lower die are movable upwardly jointly for punching the workpiece with the upper die.

In order to insure accuracy of the positioning of the workpiece or blank to be punched a monitor in the form of a microscope is provided on the apparatus for monitoring the accuracy of the positioning of the workpiece relative to the upper die. This is accomplished by monitoring the position of a reference line or points on the workpiece.

The punching operation according to the invention consists in placing the material to be punched on the movable table which is then rotated and checked for any center deviation of a circular reference line (or three or more reference points) on the material with respect to the turntable center by the monitor. The movable table is moved until there is no center deviation of the reference indicium and then the material is punched.

Since the reference circle on the material is directly monitored and its center is moved to the center of the turntable there is no need to measure the positions of the reference center and the die on the coordinates as is required with conventional apparatus. Accordingly no error occurs when the material is set in place for punching in the apparatus.

BRIEF DESCRIPTION OF THE DRAWINGS

The construction and mode of operation of the center punching apparatus according to the invention will be better understood with reference to the claims and appended drawings in which:

DESCRIPTION OF THE PREFERRED EMBODIMENT

Figure 1:
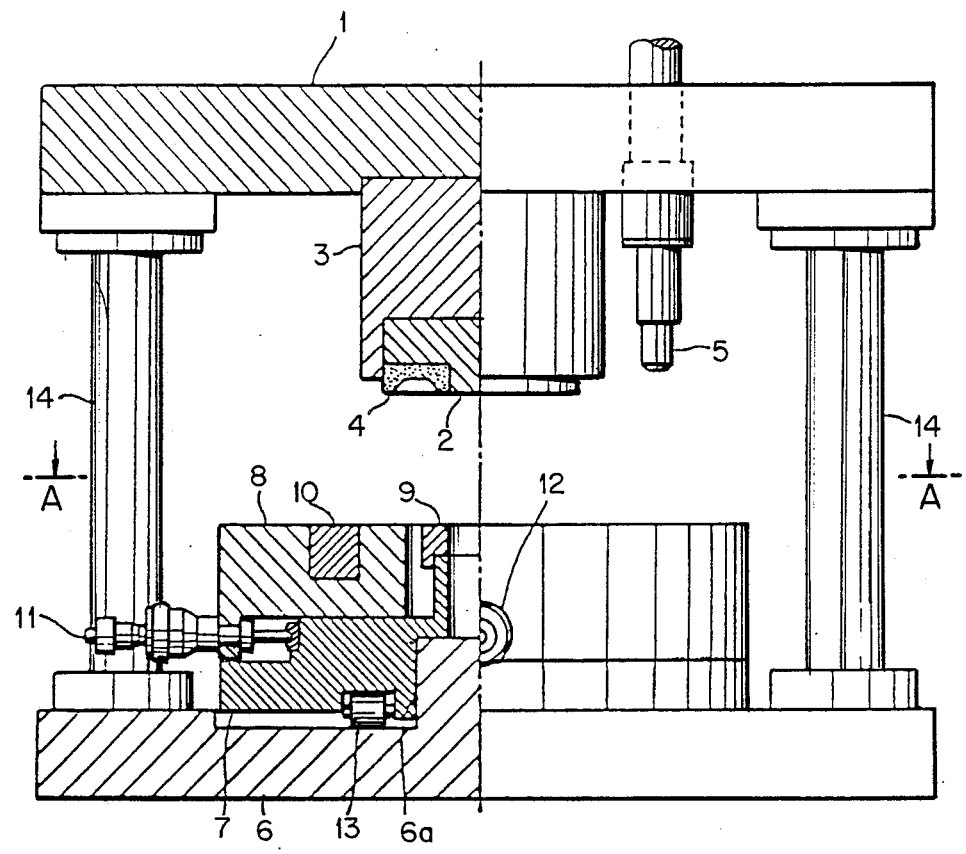
FIG. 1 is a side elevation view, partly in section, of an apparatus according to the invention.
Figure 2:
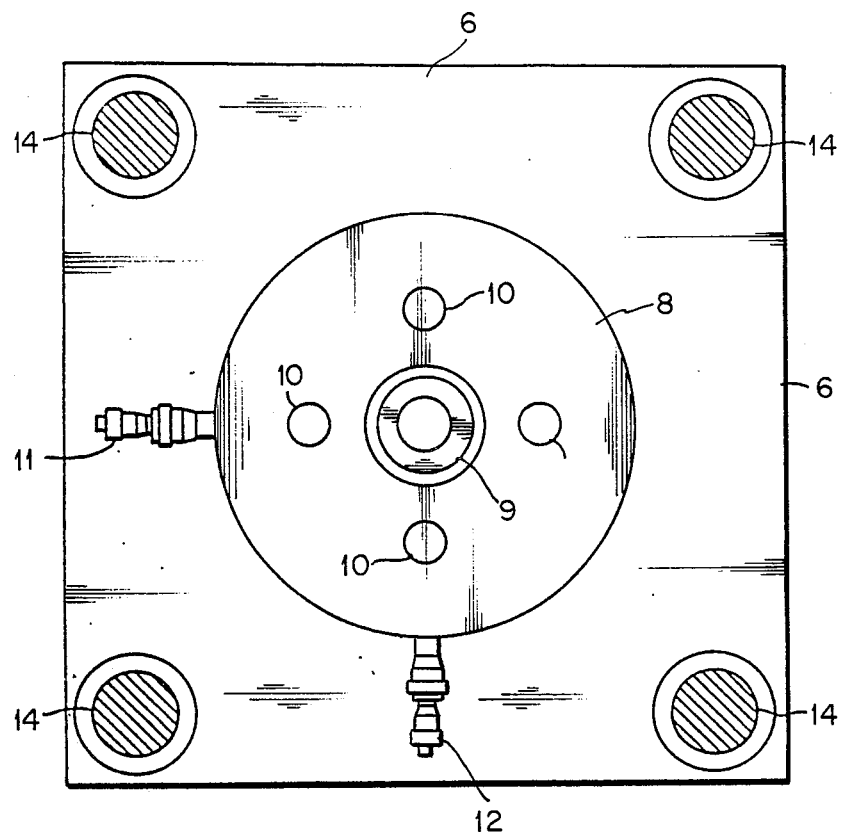
FIG. 2 is a cross section view taken along section line A—A of FIG. 1.
Figure 3:
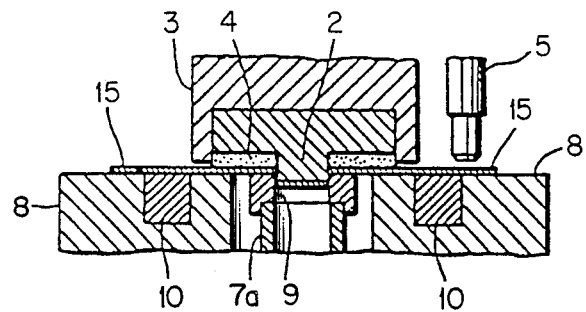
FIG. 3 is a fragmentary cross section view of the apparatus and a workpiece of material being punched.
Figure 4:
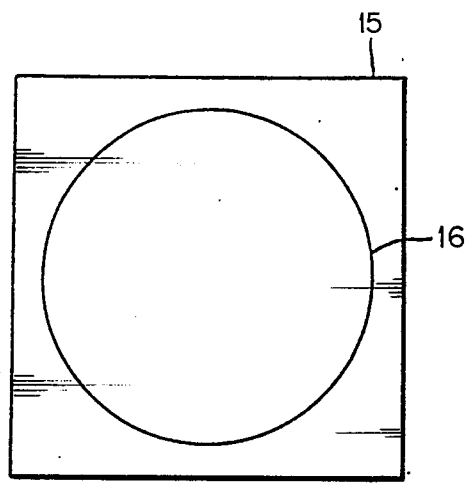
FIG. 4 is a plan view of the workpiece to be punched.

The center punching apparatus according to the invention has an upper die base 1 on which is mounted an upper die 2 secured to the upper die base via an upper die mount 3. A holder pad 4, made of a soft material, holds and protects a blank of material or workpiece to be sheared or punched during the punching process and is fitted around the rim of the upper die 2. In order to monitor the accuracy of the punching operation a microscope 5 on the upper die base 1 functions as a reference monitor means and is movable vertically for focusing and diametrically for checking a reference circle on a workpiece. The image observed through the microscope 5 is displayed on a monitor CRT (cathode ray tube), not shown. It is also possible to check the reference circle directly through the microscope 5 with the naked eye. Those skilled in the art will recognize that the microscope can also be set on the upper die base for viewing through the upper die mount 3 and into the upper die tube 2. The monitor has an appropriate magnifying power, for example 400 to 500.

A lower die base 6 is disposed spaced downwardly from the upper die base 1 and has an upwardly extending projection which provides an axis of rotation 6a for a turntable 7 mounted for rotation on the lower die base. A rotatable table 8 with a central opening is mounted on the turntable slidable in X and Y directions. A workpiece of material to be punched during operation is disposed overlying the movable table 8 and a lower die 9 is disposed rigidly secured on the turntable and rotatable therewith. The lower die, the turntable axis of rotation and the upper die are all disposed coaxial.

Provision is made for holding a workpiece to be punched on the movable table by an electromagnet 10. The construction of the holding means 10 is simple and produces no impact on the material held thereon immobile during a punching operation. Of course, a vacuum suction could also be used to hold the workpiece immobile on the movable table 8.

For properly locating the workpiece and accurately disposing it coaxial with the dies a pair of micrometers 11, 12 disposed at 90° relative to each other are provided for positioning the movable table 8 by moving it along X and Y directions independently. The turntable is smoothly rotatable on thrust bearings 13 as shown.

The assembly of the lower die base, the turntable, the lower die and the rotatable table are all jointly movable upwardly on guides in the form of guide rods 14 for executing a punching operation. In order to lift the assembly upwardly for carrying out a punching operation a lower ram hydraulic press or water pressure type or mechanical type press can be used. It being understood that the apparatus can also be constructed so that the upper die assembly is moved downwardly.

The punching operation consists in putting a material in the form of a blank or workpiece 15 to be punched on the movable table with its center as closely aligned with the center of the table 8 as possible and the electromagnet is energized to securely hold the blank or workpiece 15. The turntable 7 is then rotated and checking is carried out for any center deviation of a circular reference line or circle 16 (or three or more reference points in a circle) on the material 15 with respect to the turntable center by use of the microscope monitor 5. The movable table 8 is moved relative to the turntable 7 until there is no center deviation of the reference circle with respect to the die center and then the material is punched by raising the lower die base 6.

Since the reference circle on the material is directly monitored and the workpiece's center is moved to the center of the turntable by the movable table there is no need at all to measure the position of the reference circle center and the die on the coordinates as is required with conventional apparatus. Accordingly the positive and direct monitoring eliminates any errors when the material to be punched is set in place in the apparatus. No errors will occur as long as the centers of the rotation axis of the turntable and the die are aligned. Since the lower die is rigidly secured to the turntable their centers can be aligned with high accuracy enabling a highly precise center punching operation.

The upper die mount can be made rotatable together with a lower die. It is possible in such constructions to punch out different shapes of holes.

In this embodiment when the upper and lower dies are to be aligned the upper die mount is lightly fastened to the upper die base 1 and the lower die base 6 is raised until the upper and lower dies 2,9 are lightly engaged. In this condition the lower die 9 is turned. Usually, between the upper and lower dies there is a clearance of around 20 microns so that simply bringing these dies into engagement does not prevent the upper die from deviating from the correct position. However, turning the lower die which is engaged with the upper die brings the upper die to the exact center of the lower die. The upper die is then tightly fastened by bolts to rigidly secure the upper die mount 3 to the upper die base 1. With the dies perfectly aligned, the errors of a punched hole in the blank in terms of size, shape and center deviation are very small.

The apparatus of this invention has very few factors which contribute to errors in the punching operation and thus can ensure punching of the central position of the blank with high precision. The upper and lower dies are perfectly aligned by turning the lower die with the upper and lower dies slightly engaged. This further improves the accuracy of the apparatus.

What is claimed is:

1. A center punching apparatus comprising, an upper die base, an upper die mounted on the upper die base facedown, a lower die base, a rotatable turntable mounted on the lower die base for rotation about an axis coaxial with the upper die, a movable table on the turntable for holding a workpiece of a material to be punched and movable in X and Y directions, a lower die disposed centrally on the turntable coaxial with the upper die, the movable table having an opening circumferentially about said lower die, micrometer means for selectively moving the movable table in X and Y directions independently to accurately position said workpiece relative to the upper die, guide means extending between the upper die base and the lower die base, the lower die base, the turntable, the movable table and the lower die being movable upwardly jointly and guided by said guide means for punching the workpiece with the upper die, and monitor means on the apparatus for monitoring the accuracy of the positioning of the workpiece relative to the upper die by monitoring position of a reference indicium on the workpiece.

2. A center punching apparatus according to claim 1, in which said monitor means comprises a microscope disposed relative to the upper die for accurately monitoring said reference indicium.

3. A center punching apparatus according to claim 1, in which said micrometer means for selectively moving the movable table comprises micrometer means disposed at ninety degrees relative to each other.

4. A center punching apparatus according to claim 1, in which the movable table has means for holding the workpiece removably fixed on the movable table for punching thereof.

5. A center punching apparatus according to claim 4, in which said means for holding the workpiece comprises electromagnetic means.

6. A center punching apparatus according to claim 1, in which said lower die is disposed for rotating with said rotatable table.

7. A center punching apparatus according to claim 1, in which said upper die is rotatable relative to the upper die base, and in which said lower die is rotatable with said rotatable table.

* * * * *